No. 635,642. Patented Oct. 24, 1899.
E. BERG.
GRAIN ROLLER.
(Application filed Nov. 19, 1898.)
(No Model.)
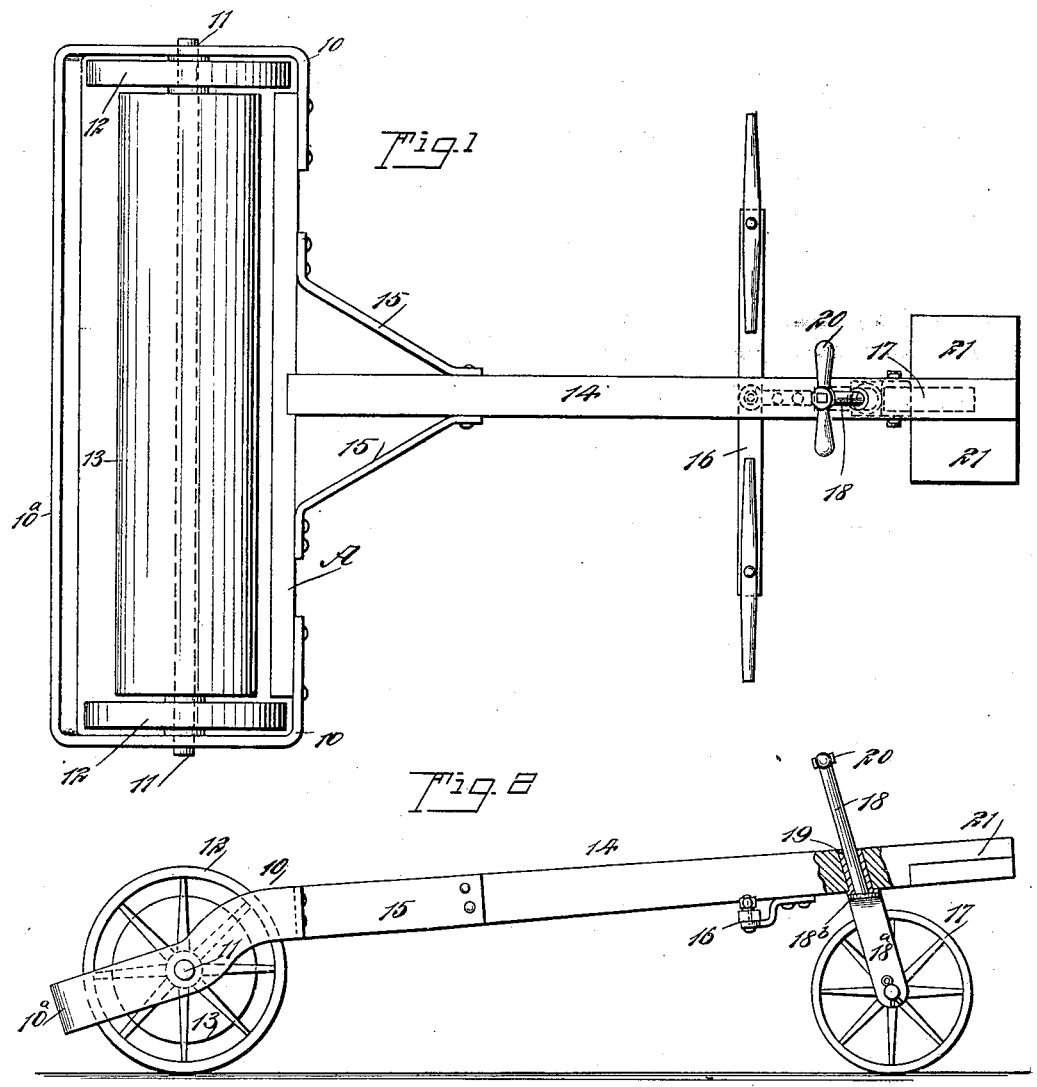
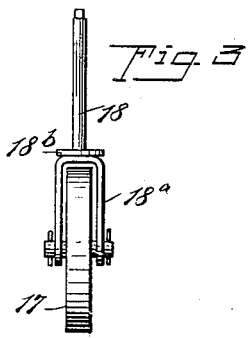

UNITED STATES PATENT OFFICE.

EMANUEL BERG, OF WOODLAND, CALIFORNIA.

GRAIN-ROLLER.

SPECIFICATION forming part of Letters Patent No. 635,642, dated October 24, 1899.

Application filed November 19, 1898. Serial No. 696,883. (No model.)

*To all whom it may concern:*

Be it known that I, EMANUEL BERG, of Woodland, in the county of Yolo and State of California, have invented a new and Improved Grain-Roller, of which the following is a full, clear, and exact description.

The object of my invention is to provide a machine through the medium of which grain may be bent over quite close to the ground while growing without injury to the roots of the grain and without interfering with the development of the heads of the grain.

A further object of the invention is to provide a machine for the purpose above described that will be exceedingly effective and that may be simply and durably constructed.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the machine. Fig. 2 is a side elevation, a portion of the machine being broken away and in section; and Fig. 3 is a detail edge view of the caster-wheel for the machine.

On the Pacific coast much money is frequently lost by reason of the exceedingly strong winds blowing from the northwest during the months of April, May, June, and July, which winds destroy the standing grain by breaking off the heads or beating the kernels out from the heads. The prime object of my invention is to provide a machine that will roll the grain down to or near the ground without breaking the grain at the roots and without interfering with the growth of the grain or its maturing properly. The grain being thus practically leveled without injury will not be injured by the above-mentioned severe wind-storms.

In the preferred form of the device a forward transverse beam A is employed, and an arm 10 is forwardly and downwardly projected from each end of said beam, the forward ends of the arms 10 being connected by a front bar 10ª, the said arms 10 constituting bearings for an axle 11, upon which supporting-wheels 12 are secured within the frame formed by the beam A, arms 10, and front bar 10ª. The axle 11 is adapted to carry a roller 13, and the ends of the roller are between the wheels 12. The roller 13 is of such diameter that at all times it will be a fixed distance from the ground, but near enough to the ground to roll down the standing grain and yet not break the grain and dislodge the kernels from the heads or dislodge the roots of the grain.

A center beam 14 is attached to the forward cross-beam A at or near the central portion of the latter, and the central or draft beam 14 is usually strengthened at its forward end by braces 15, as shown particularly in Fig. 1. A doubletree 16 is preferably pivoted upon the bottom portion of the main or draft beam 14 near its rear end, since the team employed to draw the machine faces the roller 13.

A caster-wheel 17 is located at the rear end of the machine, which caster-wheel is usually journaled in a fork 18ª, attached to a standard 18, journaled in a bearing 19, located in the draft-beam 14, and at the upper end of the fork 18ª a wear-plate 18ᵇ is preferably secured. The standard or shank of the bearing for the caster-wheel is usually given an upward and forward inclination and is provided with a handle-bar 20 at its upper end, which handle-bar assists the operator in turning the caster-wheel and also serves as a brace for the operator, since the operator usually stands upon a platform 21, located at the rear end of the main beam 14.

In operation as the machine advances the roller of the machine, assisted by the front bar 10ª, will force the standing grain downward to or near the ground without injury to the heads or to the roots of the grain, thus enabling the grain to ripen in a recumbent position and preventing the grain from being injured by heavy wind-storms.

Having thus described my invention, I claim as new and desire to secure by Letters Patent—

1. In a grain-roller, a main beam, a wheel-supported frame attached to the main beam, a roller carried by the axle of the wheels and of less diameter than said wheels, whereby it will be held out of contact with the surface over which the machine is to be drawn, a draft device attached to the main beam at the rear of the main beam, and a caster-wheel provided with an attached hand-bar journaled in the main beam at the rear of the draft device, as and for the purpose set forth.

2. A grain-roller, comprising a rectangular frame having its front bar in a lower frame than its rear bar, a wheel at each end of the frame and supporting the same, a roller mounted in the frame so as to be out of contact with the surface of the ground, a rearwardly-extending draft-beam secured to the frame, a caster-wheel supporting the end of said beam, and a draft device carried by the beam in front of the caster-wheel, substantially as described.

3. A grain-roller, comprising a rectangular frame having its front bar in a lower plane than the rear bar, an axle mounted in the frame, supporting-wheels on the ends of the axle, a roller on the axle and of less diameter than the wheels, a draft-beam secured to the rear bar of the frame, a caster-wheel mounted in the end of the draft-beam, and a draft device in front of the caster-wheel, substantially as described.

EMANUEL BERG.

Witnesses:
ISRAEL LASKY,
MORRIS MICHAEL.